US012756965B2

(12) United States Patent
Kenefick et al.

(10) Patent No.: US 12,756,965 B2
(45) Date of Patent: Oct. 6, 2026

(54) SYNTHETIC HUMAN EAR WITH OPPOSING MICROPHONES FOR DETECTING SOUND POWER/INTENSITY

(71) Applicant: Sony Group Corporation, Tokyo (JP)

(72) Inventors: Justin Kenefick, San Diego, CA (US); Gregory P. Carlsson, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 127 days.

(21) Appl. No.: 18/755,257

(22) Filed: Jun. 26, 2024

(65) Prior Publication Data

US 2026/0006361 A1 Jan. 1, 2026

(51) Int. Cl.

*H04R 1/08* (2006.01)
*G01H 3/12* (2006.01)
*H04R 3/00* (2006.01)
*H04R 25/00* (2006.01)

(52) U.S. Cl.

CPC ............... *H04R 1/083* (2013.01); *G01H 3/12* (2013.01); *H04R 3/005* (2013.01); *H04R 25/30* (2013.01)

(58) Field of Classification Search

CPC ........ H04R 1/083; H04R 3/005; H04R 25/30; G10H 3/12
USPC ........................................................ 381/355
See application file for complete search history.

(56) References Cited

U.S. PATENT DOCUMENTS

| | | | | |
|---|---|---|---|---|
| 2017/0078805 | A1 * | 3/2017 | Pedersen .............. | H04R 25/353 |
| 2019/0037324 | A1 * | 1/2019 | Darlington ............. | H04R 29/00 |
| 2020/0152185 | A1 * | 5/2020 | Usher .................. | H04R 1/1041 |

FOREIGN PATENT DOCUMENTS

| | | | |
|---|---|---|---|
| EP | 1301060 | A1 | 4/2003 |
| WO | 19970020501 | A2 | 6/1997 |
| WO | 2023019345 | A2 | 2/2023 |

* cited by examiner

*Primary Examiner* — Sean H Nguyen
(74) *Attorney, Agent, or Firm* — John M. Rogitz; John L. Rogitz

(57) ABSTRACT

In one aspect, opposing microphones may be mounted within a synthetic human ear. The synthetic human ear may form part of a head and torso simulator (HATS) system used for measuring output of any sound source, such as those embodied in headphones or loudspeakers. The opposing microphones may be used to calculate sound intensity and/or sound power, rather than just sound pressure level. The determined sound intensity/power can then be used to research and/or develop audio products, and/or quantify how a sound source is perceived regardless of acoustic loading on the HATS.

20 Claims, 6 Drawing Sheets

SYNTHETIC HUMAN EAR WITH OPPOSING MICROPHONES FOR DETECTING SOUND POWER/INTENSITY

FIELD

This disclosure relates to technical advances that are rooted in computer technology. More particularly, this disclosure relates to synthetic human ears with dual microphones that are used for testing audio equipment.

BACKGROUND

As recognized herein, headphone speakers can be fine-tuned prior to release to the public. This may be done so that the headphone speakers produce high-fidelity audio that is true to the original sound source and/or that sounds like audio that would otherwise be produced by a high-quality loudspeaker. As also recognized herein, current speaker evaluation techniques are inadequate because of varying levels of acoustic impedance at different areas between the speaker and ear, making sound pressure detection an imprecise and therefore inadequate way of measuring sound perception for human beings.

SUMMARY

As recognized herein, head and torso simulators (HATS) can be used to measure audio for a large variety of purposes with the goal to capture the experience of a real person as accurately as possible in a repeatable and predictable manner by measuring the sound pressure level (SPL) at the eardrum of the HATS. However, as also recognized herein, the acoustic impedance of the HATS measurement system may be altered by the device under test (DUT) so that the sound intensity level at the eardrum may vary from one DUT to the next although the measured SPL may be the same for both DUT, making SPL measurements at the eardrum inadequate for measurement of sound perception using a HATS.

Accordingly, in one aspect an apparatus includes a synthetic human ear. The synthetic human ear includes a first microphone and a second microphone opposing the first microphone. The apparatus also includes circuitry within the synthetic human ear. The circuitry is configured for receiving input from the first and second microphones and providing the input to a processor system.

In one specific example embodiment, the apparatus may include a head and torso simulator (HATS) system, and the synthetic human ear may form part of the HATS system.

In some cases, the synthetic human ear may include the first and second microphones and no other microphones. Additionally, in certain example implementations, the first and second microphones may oppose each other in a plane that extends transversely across an ear canal of the synthetic human ear. In other example implementations, the first and second microphones may oppose each other such that the first microphone faces toward an eardrum area of the synthetic human ear and the second microphone faces away from the eardrum area of the synthetic human ear.

Still further, in some examples the apparatus may include the processor system and storage accessible to the processor system. The storage may include instructions executable by the processor system to receive input from the first and second microphones. The instructions may then be executable to use the input to determine a sound power level for a sound signal emitted by a sound source, and/or to determine a sound intensity level for the sound signal. The sound power level and the sound intensity level may both be different from a sound pressure level for the sound signal. In addition to or in lieu of the foregoing, the instructions may be executable to use the input from the first and second microphones to output an indication of one or more adjustments to make to a speaker embodied in headphones or some other sound source/transducer, where the one or more adjustments may include a software adjustment and/or a hardware adjustment.

In another aspect, a method includes providing a synthetic human ear. The synthetic human ear includes a first microphone and a second microphone opposing the first microphone. The method also includes providing circuitry in the synthetic human ear. The circuitry is configured for receiving input from the first and second microphones and providing the input to a processor system.

In certain instances, the method may include providing a head and torso simulator (HATS) system, where the synthetic human ear may form part of the HATS system.

Also in certain instances, the method may include receiving input from the first and second microphones, and then using the input to determine a sound power level and/or sound intensity level for a sound signal emitted by a speaker/sound source. The method may then include making an adjustment to the speaker/sound source based on the sound power level and/or the sound intensity level.

In still another aspect, an apparatus includes a synthetic human ear. The synthetic human ear includes circuitry to derive sound power and/or sound intensity.

In some examples, the circuitry may include a first microphone and a second microphone opposing the first microphone. The first and second microphones may be configured within the synthetic human ear, with the circuitry configured for receiving input from the first and second microphones and providing the input to a processor system to derive sound power and/or sound intensity.

Also in some examples, the apparatus may include a head and torso simulator (HATS) system. The synthetic human ear may therefore form part of the HATS system per these examples.

Additionally, if desired the apparatus may include a processor system and storage accessible to the processor system. The storage may include instructions executable by the processor system to receive signals from the first and second microphones and to generate, using the signals and a first value representing air density, a second value representing a fluid particle velocity. The instructions may also be executable to use the second value and average air pressure as represented by the signals from the first and second microphones to generate a third value, where the third value may represent sound intensity and/or sound power. Also in some certain examples, the instructions may be executable to generate the second value by using Euler's equation on a measured pressure gradient represented by the signals from the first and second microphones in combination with the first value representing air density to generate a fourth value representing a fluid particle acceleration. The instructions may even be executable to integrate the fourth value to generate the second value. Additionally, in some specific examples the instructions may be executable to apply the third value to at least one acoustic device to produce sound in accordance with the third value. For example, applying the sound intensity to at least one acoustic device may include optimizing a perceived frequency response of a hearing protection device or hearing aid, calibrating and/or setting up a loudspeaker, mastering music, producing content comprising spatial audio, producing stereo music, and/or monitoring noise and/or noise standard acceptance for safety reasons.

The details of the present application, both as to its structure and operation, can best be understood in reference to the accompanying drawings, in which like reference numerals refer to like parts, and in which:

DETAILED DESCRIPTION

Figure 1:
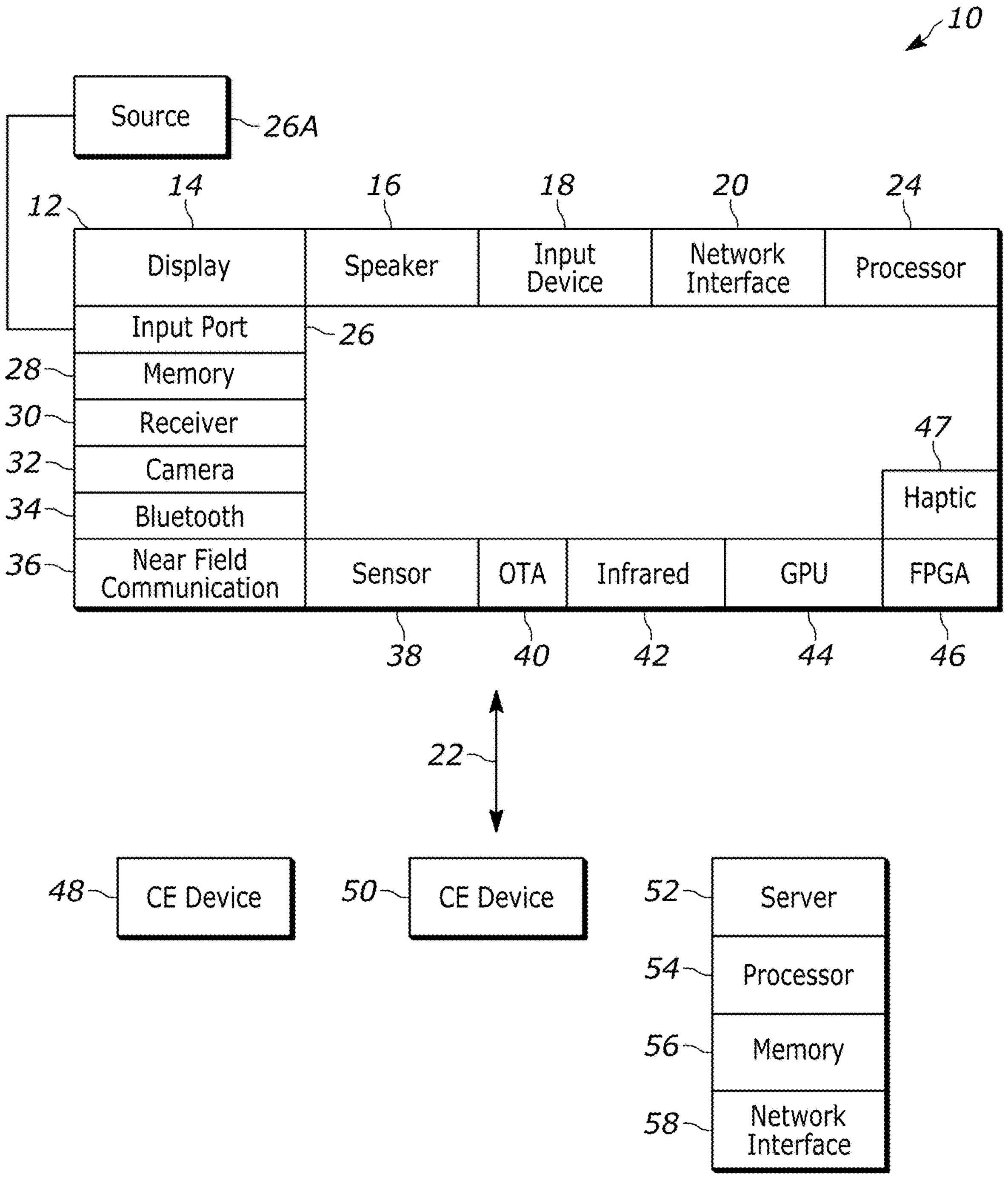
FIG. 1 is a block diagram of an example computing system consistent with present principles.

Among other things, disclosed below are systems and methods for improved measuring of the perceived frequency response for a device under test (DUT) using two microphones that are face to face inside the ear canal of a HATS system. The two microphones may be used to measure pressure, and since they are spatially close together, the results can then be used to determine a pressure gradient. With an estimated value of the density of air in the ear canal and the measured pressure gradient, Euler's equation can then be solved for the fluid particle acceleration, and integrated with respect to time to solve for the fluid particle velocity. This fluid particle velocity can then be used with the average pressure measured by the two microphones to calculate the sound intensity at the measurement position. The HATS that the ear canal is mounted in could be the shape of the average human ear canal, and the HATS ear could also have a pinnae that represents an average population (however, these shapes could also be changed to non-average geometries if desired).

The results indicating sound intensity and/or power may then be used for a variety of different tasks. For example, they can be used to optimize the perceived frequency response of hearing protection devices or hearing aids according to the intensity/power. They can also be used to provide capability for low frequency measurements in smaller rooms in a way that better correlates to perception compared to merely measuring pressure. They can also be used for loudspeaker set up or calibration, headphone or other sound device research and development, noise monitoring or noise standard acceptance for research or safety reasons, mastering music, and content production like spatial audio (music or video related) or even stereo music production.

Present principles also encompass using other techniques for deriving sound power and/or intensity may also be used in addition to or in lieu of using opposing microphones. For example, various methods of measuring particle velocity optically may be used.

With the foregoing in mind, it is to be generally understood that this disclosure relates to aspects of consumer electronics (CE) devices and other types of client devices and servers. Thus, devices herein may include server and client components which may be connected over a network such that data may be exchanged between the client and server components. The client components may include one or more computing devices including mobile smart phones and other mobile devices, wearable devices, game consoles, extended reality (XR) headsets such as virtual reality (VR) headsets and augmented reality (AR) headsets, display devices such as televisions (e.g., smart TVs, Internet-enabled TVs), personal computers such as laptops, desktop, and tablet computers, and still other types of devices. These client devices may operate with a variety of operating environments. For example, a client device consistent with present principles may employ, as examples, Linux and Unix operating systems, operating systems from Microsoft, or operating systems from Apple or Google. These operating environments may be used to execute one or more browsing programs, such as a browser made by Microsoft, Apple, Google, or Mozilla. The operating environments may also be used to execute other Internet-networked dedicated mobile applications that can access websites hosted by the Internet servers over a network such as the Internet, a local intranet, or a virtual private network.

Servers and/or gateways may be used that may include one or more processors executing instructions that configure the servers to receive and transmit data over a network such as the Internet. Or a client and server can be connected over a local intranet or a virtual private network. A server or controller may be instantiated by a personal computer, mobile device, rack or blade server, etc.

As indicated above, information may be exchanged over a network between client devices and servers. To this end and for security, servers and/or clients can include firewalls, load balancers, temporary storages, and proxies, and other network infrastructure for reliability and security.

As used herein, instructions may refer to computer-implemented steps for processing information in the system. Instructions can be implemented in software, firmware or hardware, or combinations thereof and include any type of programmed steps undertaken by components of the system.

A processor may be any single- or multi-chip processor that can execute logic by means of various lines such as address lines, data lines, and control lines and registers and shift registers. Moreover, any logical blocks, modules, and circuits described below can be implemented or performed with a processor/processor system such as a central processing unit (CPU), a digital signal processor (DSP), a field programmable gate array (FPGA) or other programmable logic device, an application specific integrated circuit (ASIC), discrete gate or transistor logic, discrete hardware components, or any combination thereof designed to perform the functions described herein. A processor can be implemented by a controller or state machine or a combination of computing devices.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

The functions and methods described below, when implemented in software, can be written in an appropriate language such as but not limited to C# or C++, and can be stored on or transmitted from a computer-readable storage medium such as a hard disk drive (HDD) or solid state drive (SSD), random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

In an example, a processor/processor system can access information over its input lines from data storage, such as a computer readable storage medium as referenced above, and/or the processor system can access information wirelessly from an Internet server by activating a wireless transceiver to send and receive data. Data typically is converted from analog signals to digital by circuitry between the antenna and the registers of the processor system when being received and from digital to analog when being transmitted. The processor system then processes the data through its shift registers to output calculated data on output lines, for presentation of the calculated data on the device, etc.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

The term "a" or "an" in reference to an entity refers to one or more of that entity. As such, the terms "a" or "an", "one or more", and "at least one" can be used interchangeably herein.

The term "circuit" or "circuitry" may be used in the summary, description, and/or claims. The term "circuitry" includes all levels of available integration, e.g., from discrete logic circuits to the highest level of circuit integration such as VLSI, and includes programmable logic components programmed to perform the functions of an embodiment as well as processors (e.g., special-purpose processors) programmed with instructions to perform those functions.

Referring now to FIG. 1, an example system 10 is shown, which may include one or more of the example devices mentioned above and described further below in accordance with present principles. The first of the example devices included in the system 10 is a consumer electronics (CE) device 12. The CE device 12 may be a computerized Internet enabled ("smart") phone, a tablet computer, a laptop/notebook computer, a desktop computer, a head-mounted device (HMD) and/or headset such as smart glasses or AR or VR headset, another wearable computerized device, etc. Regardless, it is to be understood that the CE device 12 is configured to undertake present principles (e.g., communicate with other CE devices and servers to undertake present principles, execute the logic described herein, and perform other functions and/or operations described herein).

Accordingly, to undertake such principles the CE device 12 can be established by some, or all, of the components shown. For example, the CE device 12 can include one or more touch-enabled displays 14 that may be implemented by a high definition or ultra-high definition "4K" or higher flat screens. The touch-enabled display(s) 14 may include, for example, a capacitive or resistive touch sensing layer with a grid of electrodes for touch sensing consistent with present principles (e.g., to provide input to the GUIs discussed below).

The CE device 12 may also include an analog audio output port 15 to drive one or more external speakers or headphones, and may include one or more internal speakers 16 for outputting audio in accordance with present principles. The CE device 12 may also include at least one additional input device 18 such as an audio receiver/microphone, e.g., for conversing telephonically or for entering audible commands to the CE device 12 to control the CE device 12. The example CE device 12 may also include one or more wired or wireless network interfaces 20 for communication over at least one network 22 such as the Internet, a WAN, a LAN, etc. under control of one or more processors of a processor system 24, such as a CPU or other processor mentioned above. Thus, the interface 20 may be, without limitation, a Wi-Fi transceiver and/or wireless telephony transceiver for communicating over a wireless cellular network (e.g., operated by Verizon, T-Mobile, or AT&T), both of which are examples of a wireless computer network interface. The network interface 20 may also be a wired or wireless modem or router or other suitable network interface.

It is to be understood that the processor system 24 may include one or more processors acting independently or in concert with each other to execute an algorithm, whether those processors are in one device or more than one device. The processor system 24 controls the CE device 12 to undertake present principles, including the other elements of the CE device 12 described herein such as controlling the display 14 to present images thereon and receiving input therefrom.

In addition to the foregoing, the CE device 12 may also include one or more input and/or output ports 26 such as a high-definition multimedia interface (HDMI) port or a universal serial bus (USB) port to physically connect to another CE device, and/or a headphone port to connect headphones to the CE device 12 for presentation of audio from the CE device 12 through the headphones (or other transducer). For example, the input port 26 may be connected wired or wirelessly to a cable or satellite source 26*a* of audio video content. Thus, the source 26*a* may be a separate or integrated set top box, or a satellite receiver. Or the source 26*a* may be a game console or disk player containing content.

The CE device 12 may further include one or more non-transitory computer memories/computer-readable storage media 28 such as disk-based or solid-state storage that are not transitory signals. In some cases, the media 28 may be embodied in the chassis/housing of the CE device 12 (e.g., as standalone devices) or as removable memory media or the below-described server(s).

Also, in some embodiments, the CE device 12 can include a position or location receiver such as but not limited to a cell phone transceiver, global positioning system (GPS) transceiver, and/or altimeter 30. This transceiver may therefore be configured to receive geographic position information from a satellite or cellphone base station (and/or determine an altitude at which the CE device 12 is disposed) and then provide the information to the processor system 24. However, it is to be understood that another suitable position receiver other than a GPS receiver, cell phone transceiver, and/or altimeter may be used consistent with present principles to determine the location of the CE device 12.

Continuing the description of the CE device 12, in some embodiments the CE device 12 may include one or more cameras 32 that may be thermal imaging cameras, digital cameras such as webcams, infrared (IR) sensors, and/or other types of cameras or other optical sensors integrated into the CE device 12 and controllable by the processor system 24 to gather pictures/images and/or video consistent with present principles. Also included on the CE device 12 may be a Bluetooth® transceiver 34 and/or other Near Field Communication (NFC) element 36 for communication with other devices using respective Bluetooth and/or NFC wireless technologies/communication standards. An example NFC element can be a radio frequency identification (RFID) element.

Further still, the CE device 12 may include one or more auxiliary sensors 38 that provide input to the processor system 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

Other sensor examples include a motion sensor such as an accelerometer, gyroscope, magnetometer, a speed and/or cadence sensor, an event-based sensor, a gesture sensor (e.g., for sensing gesture command), etc. In one specific example, the sensor 38 thus may be implemented as an inertial measurement unit (IMU) with motion sensors including individual accelerometers, gyroscopes, and magnetometers, and/or other components of that include a combination of accelerometers, gyroscopes, and magnetometers, to determine the location and orientation of the CE device 12 in three dimensions. A gyroscope consistent with present principles may sense and/or measure the orientation of the CE device 12 and provide related input to the processor system 24, an accelerometer consistent with present principles may sense acceleration and/or movement of the CE device 12 and provide related input to the processor system 24, and a magnetometer consistent with present principles may sense and/or measure directional movement of the CE device 12 and provide related input to the processor 122.

The CE device 12 may also include an over-the-air TV broadcast port 40 for receiving OTA TV broadcasts and providing the input to the processor system 24. In addition to the foregoing, it is noted that the CE device 12 may also include an IR transceiver 42 such as an IR data association (IRDA) device. A battery (not shown) may be provided for powering the CE device 12, as may a kinetic energy harvester that may turn kinetic energy into power to charge the battery and/or power the CE device 12. The CE device 12 may also be powered by an alternating current power supply. A graphics processing unit (GPU) 44 and field programmable gated array 46 also may be included.

One or more haptics/vibration generators 47 may also be provided for generating tactile signals/vibrations that can be sensed by a person holding or in contact with the device. The haptics generators 47 may thus vibrate all or part of the CE device 12 using an electric motor connected to an off-center and/or off-balanced weight via the motor's rotatable shaft so that the shaft may rotate under control of the motor (which in turn may be controlled by a processor such as the processor system 24) to create vibration of various frequencies and/or amplitudes as well as force simulations in various directions.

In addition to the CE device 12, the system 10 may include one or more other CE devices/types, which may include some or all of the components mentioned above in relation to the CE device 12. In one example, a second CE device 48 may be established by an Internet of things (IoT) device, a smartphone, a laptop computer, etc. A third CE device 50 is also shown in FIG. 1 and may include similar components as the other CE devices. Thus, in one example, the CE device 50 may be configured as a head-mounted display (HMD) that may include a heads-up transparent or non-transparent display for respectively presenting extended reality (XR) content such as AR content, VR, content, and/or mixed reality (MR) content. The XR content itself might include, as an example, one or more of the GUIs described below, presented stereoscopically. The HMD may be configured as a glasses-type display, or as goggle-type and/or VR-type display vended by various computer hardware manufacturers such as Apple, Oculus, Meta, etc.

In the example shown, only three CE devices are shown, it being understood that fewer or more devices may be used. A device herein may implement some or all of the components shown for the CE device 12. Any of the components shown in the following figures may incorporate some or all of the components shown in the case of the CE device 12.

Now in reference to the afore-mentioned at least one server 52, it includes at least one server processor/processor system 54 and at least one tangible computer readable storage medium 56 such as disk-based or solid-state storage. The server 52 also includes at least one network interface 58 that, under control of the server processor 54, allows for communication with other illustrated devices over the network 22 (e.g., the Internet), and indeed may facilitate communication between the server 52 and any other servers/client devices as described herein. Note that the network interface 58 may be, e.g., a wired or wireless modem or router, Wi-Fi or Ethernet transceiver, or other appropriate interface such as, e.g., a wireless telephony transceiver.

Accordingly, in some embodiments the server 52 may be an Internet server or an entire server "farm" of multiple services. If desired, the server 52 may include/perform "cloud" functions such that the devices of the system 10 may access a "cloud" environment via the server 52 in certain example embodiments. Additionally or alternatively, the server 52 may be implemented by one or more computers in the same room as the other devices shown, or nearby.

The components shown in the following figures may include some or all components shown herein. Any user interfaces (UI) described herein may be consolidated and/or expanded, and UI elements may be mixed and matched between UIs.

With the foregoing in mind, present principles recognize that it is desirable to test headphone speakers, loudspeakers, and other types of speakers during production before the speakers are released to the public. A manufacturer or other entity might do so to ensure that the speaker's hardware and software are optimized to produce high-fidelity audio without undue distortion and other negative sound effects.

Present principles therefore recognize that testing may be done using a measurement system where opposing microphones are placed inside a synthetic human ear to test audio fidelity of the speaker(s). The ear may be a stand-alone ear, or even being incorporated into a head and torso simulator (HATS) system. The microphones may be, without limitation, condenser or capacitor microphones, though other microphones may also be used.

Accordingly, among other things, the description below describes measuring an acoustic signal in a manner that measures the perceived frequency response that a typical person would experience in a way that it is repeatable for different sound sources (e.g., speakers) or environments, regardless of the acoustic loading on the measurement system created by the sound source(s) and/or environment (s). This may be done via measurement of sound power and/or sound intensity using the opposing microphones since, as recognized herein, sound pressure level (e.g., volume) is not adequate for directly measuring sound perception at various audio frequencies for any device that affects the acoustic loading on the system, such as headphones. However, present principles may be applied to configuration of loudspeakers and other types of sound sources as well.

In terms of sound pressure itself not being adequate, present principles recognize that based on subjective listening to results of headphones equalized using HATS pressure measurements, HATS pressure measurements at the eardrum are inconsistently related to perceived frequency response. Thus, even though real-life organic human eardrums are sensitive to sound intensity and sound power, sound pressure level if used to measure loudness during speaker production may be inadequate even though measuring sound pressure is relatively straightforward. But in applying present principles, either sound power or sound intensity can be used to quantify the resulting measurements using an opposing microphone setup. These two quantities are both valid for perception measurements because the area of the eardrum and ear canal are constant from one measurement to the next, so the quantities may be proportional to each other (with it being further noted that although the absolute measurement of these quantities may vary from each other, their proportionality informs that the quantities will vary with frequency by equal amounts in decibels for the same change in signal input.).

Thus, note consistent with present principles that acoustic impedance may be derived from pressure. Acoustic impedance may be understood as the resistance to pressure variation of a medium. Acoustic impedance (z) may be quantified by the change in acoustic pressure (p) that results from some amount of particle velocity (v), ($z=p/v$).

Additionally, acoustic impedance can vary with frequency. In an acoustic system consistent with present principles, such as speakers embodied in headphones that are placed on the user's head at or near the ears, several different acoustic impedances may be at play. For example, there might be one acoustic impedance for the air outside of the ear (free air), another acoustic impedance of air in the user's ear canal leading up to the eardrum, yet another acoustic impedance for the ear drum itself, and still another acoustic impedance in terms of a sound source (e.g., speaker) that is intended to be measured.

The acoustic impedance of the system that is outside of the ear may be referred to as the "acoustic loading," and it may be either the free air impedance or some other impedance applied from the device under test (DUT). The DUT might be headphones (closed back), earbuds with speakers, or something else that is blocking off the ear system from free air. The DUT might also be open-back headphones where sound and air can move more freely away from the user's head out the sides/backs of the headphones due to reduced or no back pressure compared to closed-back headphones.

Also note that some of the impedances above may be inherently coupled, such as the impedance of the ear canal and the impedance of the ear drum. Other impedances might be at play only during certain measurement setups. For example, when the sound source is a speaker in free air, whether that be a loudspeaker or open-back headphones, the free air impedance may be more important for accurate measurement via the ear/measurement system than the speaker impedance itself. But when the sound source is a closed-back headphone, the headphone impedance might be more important for measurement purposes than the free air impedance. This difference may be due to the way that acoustic impedances interact to create a total system impedance.

One way to think about present principles is using springs. Consider that a spring has some stiffness akin to impedance for non-limiting illustration only. If two springs with different stiffnesses are stacked and compressed, the softer spring will compress more than the stiffer spring, and the overall compression of the system becomes controlled by the stiffness of the softer spring. However, the stiffer spring will still have some effect on the total compression, and the stiffer it is compared to the softer spring, the less effect it will have. This helps illustrate present principles related to acoustic impedance, in that the section of the acoustic system with the lowest impedance may control the overall system impedance but the higher impedance may still have some affect. Additionally, because acoustic impedance varies with frequency, the amount that a given impedance controls the system impedance will also vary with frequency.

With the foregoing in mind, it may be appreciated that pressure in free air may be directly related to intensity at the eardrum only as long as the acoustic system impedance is constant, which is why measurements using a microphone in free air directly correlate to perceived frequency response. But this is unrealistic in real life due to the different impedances at play in real life as set forth above, and therefore demonstrates why measuring sound pressure at the eardrum is inadequate. Also, adding a DUT in to the acoustic system may change the system impedance. All this affects how pressure correlates to perception and the two concepts are no longer directly related. Instead, it becomes controlled by some combination of the impedance of the DUT, air cavity in the pinna and DUT, ear canal, and ear drum. Pressure measurements of this new acoustic system can therefore no longer be directly compared to pressure measurements of a free air acoustic system to gain understanding of sound fidelity, because the sound intensity or power at the ear drum becomes different between the two systems even though the pressure at the ear drum might the same. But present principles dispense with the shortcoming of measuring pressure at the ear drum and expecting to measure perceived frequency response, since opposing microphones are used to derive sound intensity and/or power instead. Comparisons may then be performed in comparing intensity/power detected by the opposing microphones to intensity/power measurements of a free air acoustic system or any other acoustic system which has been varied by the DUT to determine sound fidelity.

Accordingly, by deriving sound intensity and/or power at or near the eardrum of a HATS, the acoustic impedance(s)

of the system are also included in the measurement indirectly by the system's measurement of particle acceleration and pressure. So changes to the acoustic impedance of the system become less important or even irrelevant, and measurements through opposing microphones can directly measure the perceived frequency response regardless of the acoustic loading as might be affected by a DUT (e.g., headphones).

With the foregoing backdrop, present principles recognize that sound power and/or sound intensity can be derived via opposing microphones within a synthetic human ear, whether in a HATS system or not, to gain a more accurate measurement of the perceived frequency response that a typical person would experience for different audio frequencies as produced by headphones, loudspeakers and/or other types of sound sources.

Sound power (P) may be defined as area (A) multiplied by intensity (I), (P=AI).

Sound intensity (I) may be defined as pressure (p) multiplied by particle velocity (v), (I=pv).

These quantities can vary with frequency either due to an interaction with acoustic impedance or in their own right.

Figure 2:
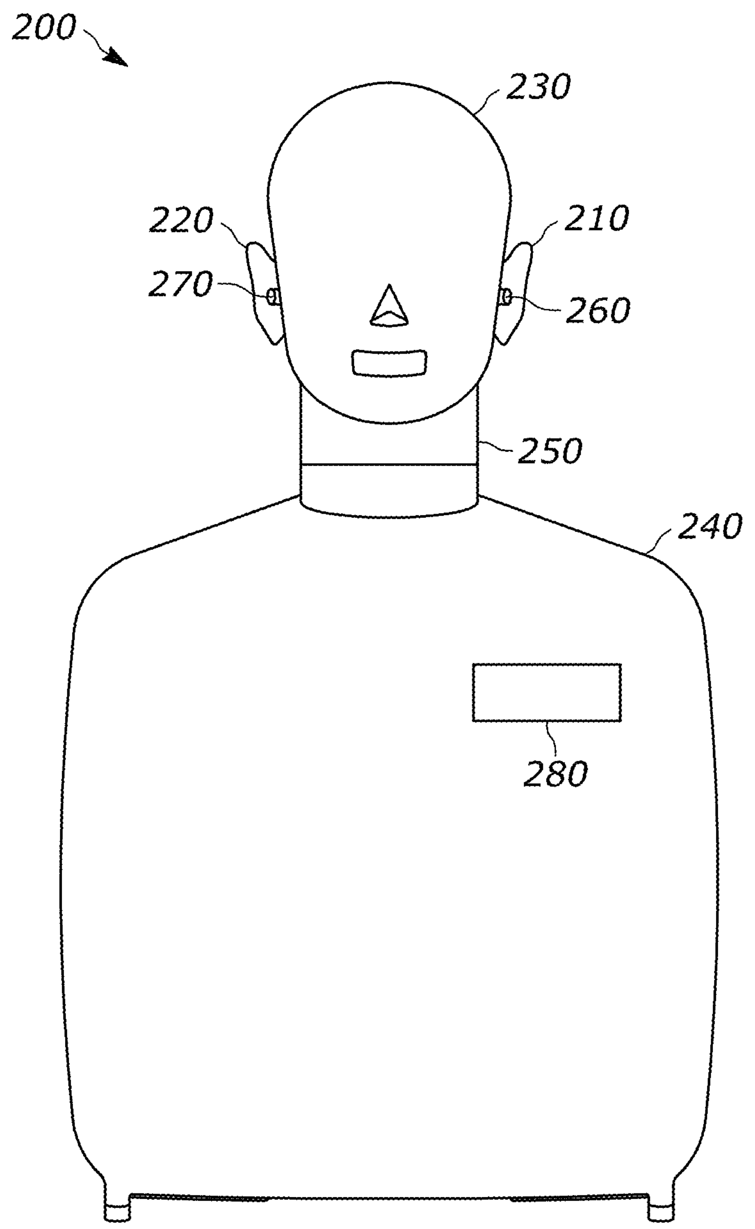
FIG. 2 shows a front elevational view of an example head and torso simulator (HATS) system with two synthetic ears, each ear with opposing microphones, consistent with present principles.

Reference is now made to FIG. 2. This figure shows an electronic mannequin in the form of a head and torso simulator (HATS) system 200. A left synthetic human ear 210 and a right synthetic human ear 220 are integral with or otherwise coupled to a head 230 of the HATS system 200. The ears 210, 220 may each include a pinnae and ear canal, and might even include a synthetic ear drum or at least an ear drum area where the ear drum would otherwise be. All other parts of the human ear anatomy might even be included. A torso 240 of the HATS system 200 is coupled to the head 230 via an integral neck 250. The HATS system 200 may be made of certain materials to mimic the physical properties of an actual real-world person's head, neck, and torso. The HATS system 200 may thus be configured to propagate sound and diffract acoustics similar to how an actual person's body might. Accordingly, the materials included in the HATS system 200 may include, but are not limited to, silicone, collagen, calcium, liquid suspensions, gelatinous substances, elastomers, epoxy resins, and textiles.

Additionally, each of the ears 210, 220 may include two microphones that oppose each other (not shown in FIG. 2) as well as respective circuitry 260, 270 in the respective ear 210, 220. The circuitry 260, 270 may include, without limitation, wires, traces, resistors, transistors, capacitors, microprocessors, storage media, network interfaces, etc. The circuitry 260, 270 may be respectively configured for receiving input from the plural microphones in the respective ear and then providing the input to a processor system, possibly through other circuitry 280 in the HATS system 200 that is itself wirelessly or wiredly connected to a computing device housing the processor system (e.g., CE device 12 from FIG. 1). The computing device may therefore be integrated into the HATS system 200 or may be separate from it as embodied in a laptop computer or other device.

Figure 3:
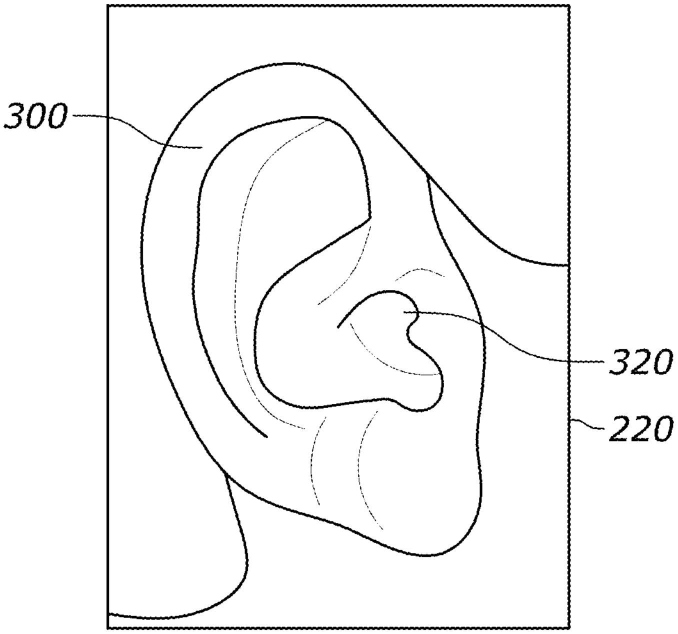
FIG. 3 shows a close-up side view of a right ear of the HATS system consistent with present principles.

FIG. 3 shows the right ear 220 in greater detail. The ear 220 includes a synthetic ear pinnae 300 as well as a synthetic ear canal 320, with it being further noted that the left ear 210 would also include a similar synthetic pinnae and ear canal. At least two opposing microphones, and in some examples only two microphones (no other microphones), may be located within the ear canal 320. Only two microphones may be used in certain non-limiting examples to minimize processing complexity of the sound signals while still deriving sound power/intensity, and because including additional microphones could disturb the acoustics of the system and make it less life-like due to changes in sound propagation through the canal 320 caused by the inclusion of additional microphones. However, inclusion of additional microphones may still be considered to increase fidelity of the measurements, which may become more practical and beneficial as microphone size decreases. Also note that opposing microphones may also be included in the left ear 210 as well.

Figure 4:
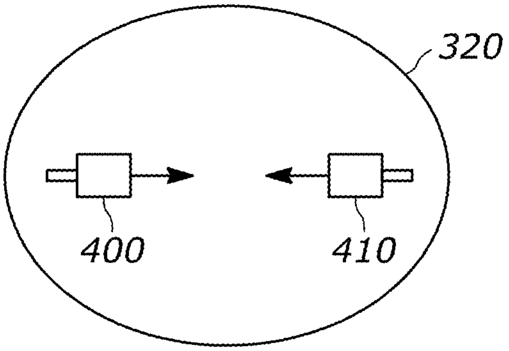
FIG. 4 shows a transverse cross sectional view of a synthetic ear canal with opposing microphones mounted within according to a first example microphone configuration consistent with present principles.
Figure 5:
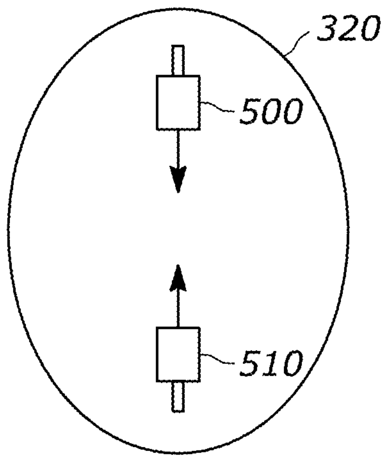
FIG. 5 shows a transverse cross sectional view of a synthetic ear canal with opposing microphones mounted within according to a second example microphone configuration consistent with present principles.
Figure 6:
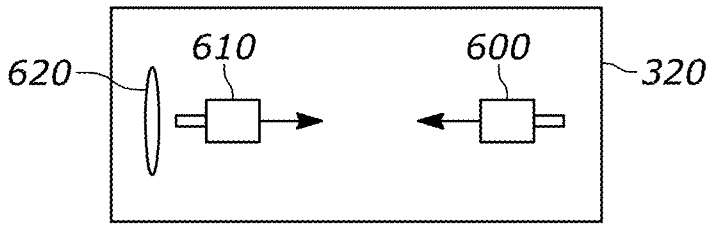
FIG. 6 shows a longitudinal cross sectional view of a synthetic ear canal with opposing microphones mounted within according to a third example microphone configuration consistent with present principles.

FIGS. 4-6 then show different views of the ear canal 320 to demonstrate different opposing microphone configurations for the two microphones affixed within in the canal 320. Beginning first with FIG. 4, a transverse cross sectional view of the canal 320 is shown. FIG. 4 also shows that a first microphone 400 is mounted in the ear canal 320 and faces towards a second microphone 410, while the second microphone 410 is also mounted within the ear canal 320 to face toward the first microphone 400, as represented by the arrows shown.

Note according to FIG. 4 that the microphones 400, 410 may be mounted within the canal 320 in a same transverse plane of the ear canal 320, though they may be mounted in a diagonal plane in other examples. Also note that the microphones 400, 410 are oriented horizontally with respect to each other in the transverse plane per FIG. 4. The microphones 400, 410 may be mounted no more a centimeter away from the eardrum area, if desired, to more-accurately reflect actual human hearing. This establishes a first opposing microphone configuration in which the axes/fronts of the microphones 400, 410 face each other at a bearing of zero degrees.

FIG. 5 shows a second opposing microphone configuration. Specifically, FIG. 5 shows a transverse cross sectional view of the canal 320 with a first microphone 500 mounted in the ear canal 320 and facing towards a second microphone 510, with the second microphone 510 also mounted within the ear canal 320 to face toward the first microphone 500, as represented by the arrows shown.

Note according to FIG. 5 that the microphones 500, 510 may still be mounted within the canal 320 in a same transverse plane of the ear canal 320. But here, in contrast to FIG. 4, the microphones 500, 510 of FIG. 5 are oriented vertically with respect to each other in the transverse plane. This establishes a second opposing microphone configuration in which the axes/fronts of the microphones 500, 510 face each other at a bearing of zero degrees. Other opposing microphone configurations in a transverse or diagonal ear canal plane are also encompassed by present principles, including diagonally-oriented opposing microphone configurations in a transverse plane. Again the microphones 500, 510 may be mounted no more a centimeter away from the eardrum area, if desired, to more-accurately reflect actual human hearing.

FIG. 6 shows a longitudinal cross sectional view of the canal 320 according to another example opposing microphone embodiment consistent with present principles. Here, a first microphone 600 is mounted in the ear canal 320 to face towards a second microphone 610, with the second microphone 610 also being mounted within the ear canal 320 to face toward the first microphone 600, as represented by the arrows shown.

Note according to FIG. 6 that the microphones 600, 610 may be mounted within the canal 320 in a same longitudinal plane of the ear canal 320 along the transverse center of the ear canal 320, with the microphones 600, 610 being longitudinally spaced from each other within the ear canal 320. This establishes a yet another opposing microphone configuration in which the axes/fronts of the microphones 600, 610 face each other at a bearing of zero degrees. Other opposing microphone configurations in a longitudinal ear canal plane are also encompassed by present principles, including opposing microphone configurations in which the microphones 600, 610 are longitudinally spaced from each other along (transverse) upper, lower, left, and right portions of the ear canal 320. But however longitudinally mounted in the ear canal 320 and longitudinally spaced from each other, it may be appreciated from FIG. 6 that the first and second microphones 600, 610 oppose each other such that the first microphone faces toward an eardrum area 620 of the synthetic human ear 220 and the second microphone 610 faces away from the eardrum area 620 of the synthetic human ear. The eardrum area 620 may include a synthetic human eardrum in some examples, and in other examples it may simply be an area at which an ear drum would be anatomically located.

Note that still other opposing microphone configurations are possible besides those described above. For example, one microphone of a pair of opposing microphones may be located at the eardrum surface itself (e.g. with the microphone's outer surface facing the other microphone while flush with the eardrum surface), and the other microphone may be facing the eardrum surface in the canal. As another example, one or both of the microphones of the pair may be located flush with the surface of the ear canal, facing each other. As still another example, one or both of the microphones of the pair may be farther outside of the ear canal, towards the entrance of the ear canal which is commonly referred to as the "ear entrance point". The microphones may also be built in to the walls of the ear canal of the synthetic human ear so that they may be closer to or at perpendicular with the plane of the eardrum.

Figure 7:
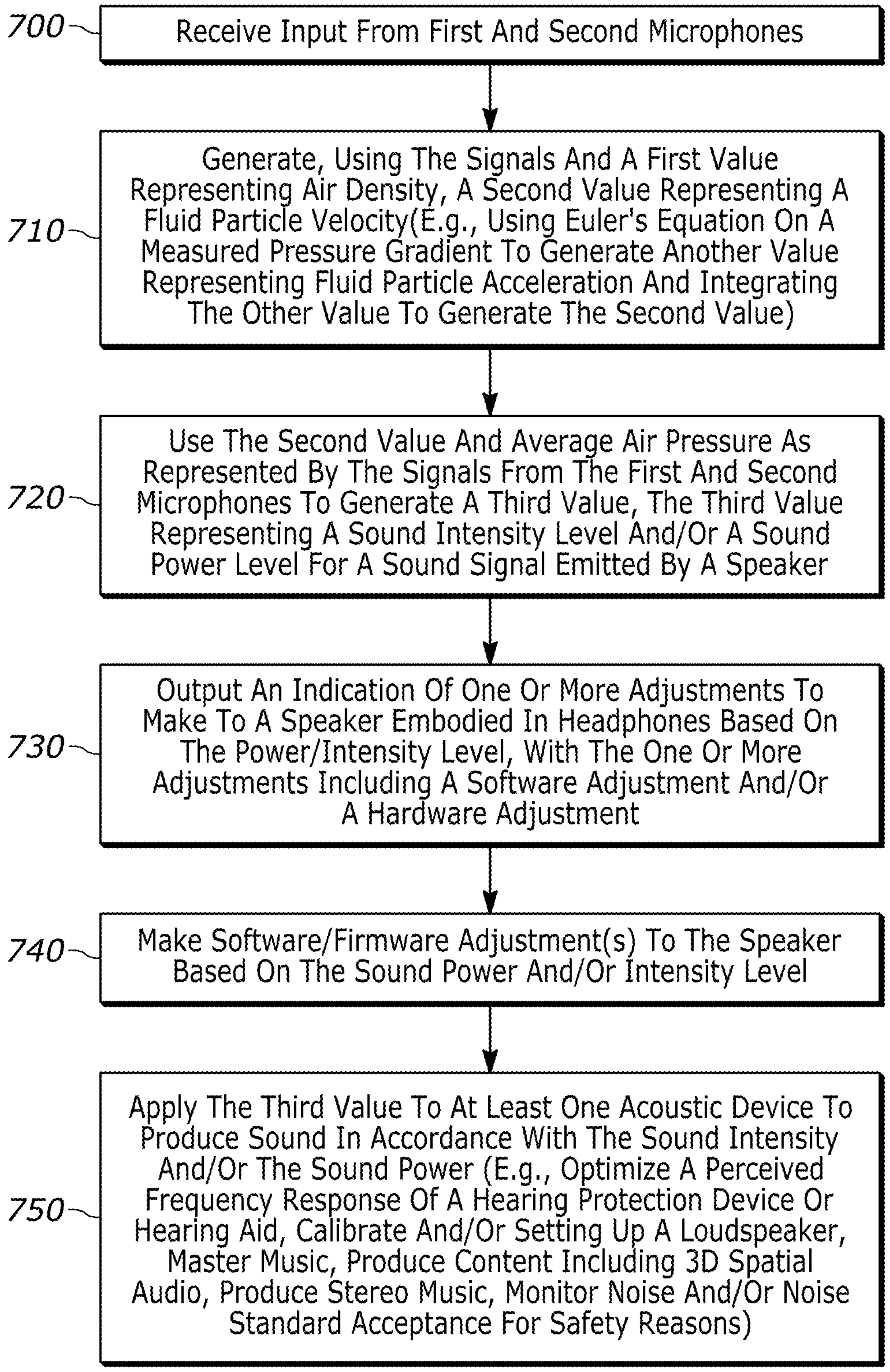
FIG. 7 illustrates example logic in example flow chart format that may be executed by a device/processor system consistent with present principles.

Referring now to FIG. 7, it shows example logic that may be executed by a processor system embodied in one or more devices, device such as the CE device 12, with the processor system being in communication with opposing microphones in a synthetic ear consistent with present principles. Note that while the logic of FIG. 7 is shown in flow chart format, other suitable logic may also be used.

Beginning at block 700, the device may receive input/signals from the first and second microphones. The input may indicate a volume level and one or more frequencies for a sound signal emitted by a speaker of a DUT, such as a speaker in closed-back headphones for example. The frequency of the sound signal itself may be determined using a Fast Fourier Transform (FFT) or other suitable method, for example. From block 700 the logic may then proceed to block 710.

At block 710 the device may generate, using the signals from the first and second microphones and using a first value representing air density, a second value representing a fluid particle velocity. The first value representing air density may be an estimated value of the density of air in the ear canal 320 as may be assumed and preset by a programmer. Additionally or alternatively, the first value may have been empirically determined using an aerometer or other sensor within the ear canal 320 prior to execution of the logic of FIG. 7.

Additionally, in one specific example, the second value may be generated at block 710 by applying Euler's equation using a measured pressure gradient represented by the signals from the first and second microphones (e.g., difference in volume detected between the two microphones) in combination with the first value representing air density to generate another value (a "fourth" value per FIG. 7) that represents a fluid particle acceleration from which the second value itself can then be derived. Specifically, the fourth value may be integrated with respect to time to generate the second value (e.g., with it being understood that acceleration and velocity are related to time even if, say, the fourth value itself relates to an instantaneous moment in time).

Note here that Euler's equation itself is $e^{ix}=\cos x+i \sin x$, where "x" is a real number and where "i" is the imaginary unit $i=\sqrt{-1}$. In the present instance, "x" may be the measured pressure gradient.

From block 710 the logic may then proceed to block 720. At block 720 the device may use the second value and an average air pressure (e.g., volume) as represented by the signals from the first and second microphones to generate a third value. The third value may represent sound intensity and/or sound power, with the average air pressure itself being the mean of the air pressure detected at each microphone for a given sound signal of a particular frequency. Therefore, at block 720 to solve for sound intensity, sound intensity (I) may be determined as the average air pressure (p) multiplied by the second value for particle velocity (v), per the equation $I=pv$. Then to solve for sound power, the sound power (P) may be defined as area (A) (e.g., anatomical average ear drum area, or some specific area for that particular artificial ear) multiplied by intensity (I), per the equation $P=AI$.

From block 720 the logic may then proceed to block 730. At block 730 the device may output an indication of one or more adjustments to make to the speaker that emitted the sound signal detected by the first and second microphones (e.g., a speaker embodied in headphones). The one or more adjustments may include software adjustments and/or hardware adjustments. The outputs may be in the form of specific adjustments to make based on the determined sound power and/or sound intensity, or may indicate the adjustments to make via presenting the determined sound power and/or sound intensity itself. These aspects of the output will be discussed in greater detail below in reference to FIG. 9, but here note that the adjustments themselves may be determined based on the difference between the derived sound intensity/power for the DUT and a derived sound intensity/power for the same sound signal at a same distance from the sound source as the DUT but for a free air acoustic system (with the difference being minimized or eliminated per the adjustments).

However, still in reference to FIG. 7, from block 730 the logic may proceed to block 740. At block 740 the device may autonomously make the determined adjustments to the speaker circuitry based on the sound power/intensity level. For instance, at block 740 the device may adjust firmware or other software in the DUT (that itself includes the speaker) to boost or reduce future volume for future audio in a particular frequency that is the same as the frequency of the detected sound signal itself (or boost/reduce volume in a frequency range into which the detected sound signal falls). The boost or reduction may be in comparison to the preset volumes for audio in other frequencies/ranges. The altered firmware or other software may then be saved with the changes, with the software being saved as an audio profile in the DUT that a digital signal processor (DSP) or other microprocessor in the DUT would then use during deployment when processing sound signals for audio rendering using the DUT's speaker(s).

From block 740 the logic may then proceed to block 750. At block 750 the device may apply the third value (e.g., determined sound intensity or sound power) to at least one acoustic device to produce sound in accordance with the third value for sound intensity/power. Thus, the power/intensity derivation may be used to do equalization of measurements between, for example, headphones as the DUT and a loudspeaker to which the sound is being compared (same sound being emitted by both the headphones and loudspeaker) for the headphones to then produce sound in accordance with the third value itself per the equalization. As examples, at block 750 the logic may therefore optimize a perceived frequency response of a hearing protection device or hearing aid, calibrate and/or set up a loudspeaker (e.g., it's audio profile), master music, produce content that includes binaural 3D spatial audio, produce stereo music, and/or monitor noise and/or noise standard acceptance for safety reasons. Other implementations are also encompassed by present principles. The process of FIG. 7 might then repeat for additional sound signals in different frequencies/ranges.

Figure 8:
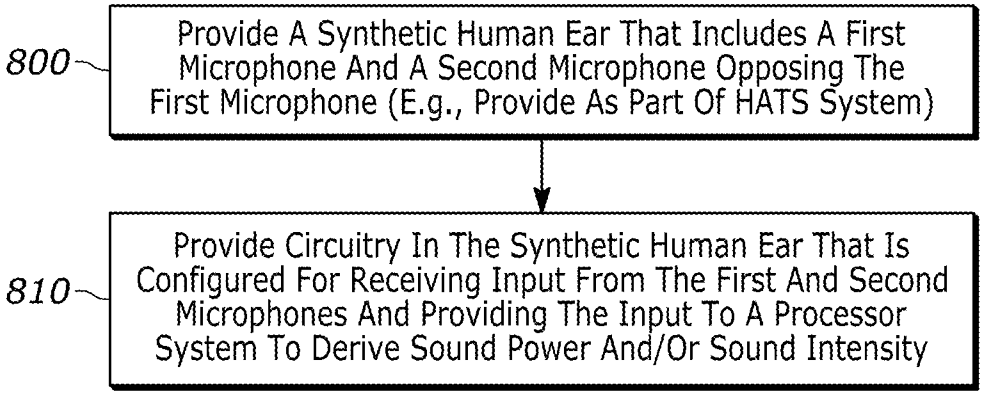
FIG. 8 is a flowchart of an additional process flow that may be performed consistent with present principles.

Continuing the detailed description in reference to FIG. 8, this figure also shows an example process flow that may be performed consistent with present principles. Beginning at step 800, a synthetic human ear may be provided, such as via one or more channels of trade like a point of sale, a shipping channel, and/or from a manufacturing entity to a distributor. Note that the synthetic human ear may include a first microphone and a second microphone opposing the first microphone consistent with other aspects of this detailed description. As a specific example, at step 800 the synthetic human ear with the opposing microphones may be provided as part of a HATS system.

Then at step 810 circuitry may be provided in the synthetic human ear, possibly as part of the same interaction as step 800. Note that the circuitry may be configured for receiving input from the first and second microphones and providing the input to a processor system to derive sound power/intensity consistent with other aspects of this detailed description.

Figure 9:
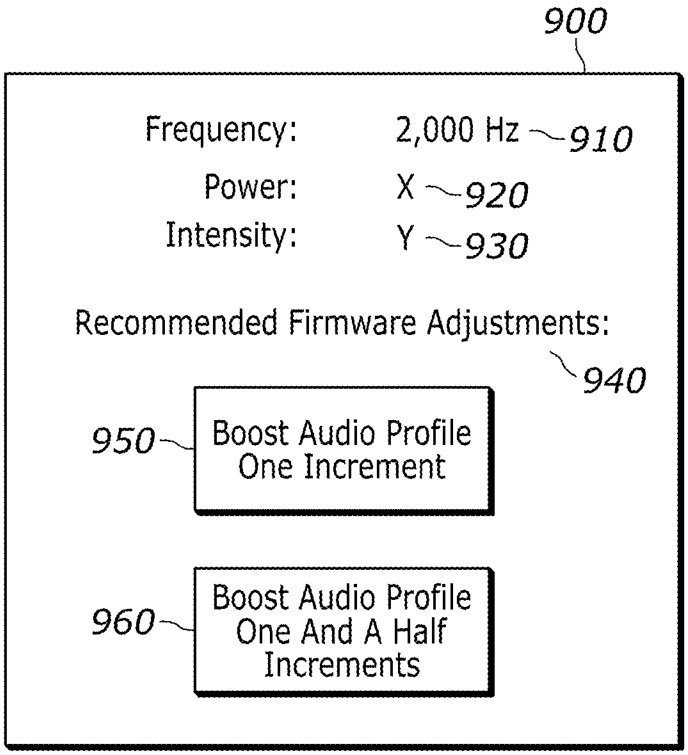
FIG. 9 shows an example graphical user interface (GUI) that may be presented on a display to configure a speaker under test consistent with present principles.

Continuing the detailed description in reference to FIG. 9, this figure shows an example graphical user interface (GUI) 900 that may be presented on the display of a device in communication with a HATS system/synthetic ear with opposing microphones consistent with present principles. As shown, the GUI 900 may include an indication 910 of a particular frequency or frequencies of sound signals detected by the opposing microphones from which a sound intensity and/or sound power are determined. Respective indications 920, 930 of the determined sound intensity and power themselves may also be presented on the GUI 900.

As may also be appreciated from FIG. 9, the GUI 900 may include a prompt 940 asking the user whether the user would like to make one or more computer-recommended firmware adjustments to the speaker in the DUT. Accordingly, a first selector 950 may be presented to boost a frequency or frequency range of volume in the detected sound signal frequency by one increment as stored in a sound profile for the speaker/DUT, while a second selector 960 may be presented to boost the frequency/range by one and a half increments. Note that reducing by certain increments might also be presented as options as well.

Additionally or alternatively, selectors may also be presented to adjust the results of a second measurement to the results of a first measurement. For example, there may be a first measurement of speakers or an arbitrary target sound source, followed by a second measurement of headphones or some other arbitrary sound source. The software could then automatically adjust all measured frequencies from the second measurement to match the first measurement (e.g., responsive to selection of the selector), so that the second source seems to match the perceived sound of the first source.

Additionally, a selector may also be presented to record the intensity of an impulse response signal or other time-based signal, so that the phase response of the two systems may also be measured and can be adjusted. In non-limiting examples, this may be important for measuring the perception of a full sound source.

It may now be appreciated that improved HATS systems and measurements are provided for better matching human hearing perception even with the DUT (such as headphones, earbuds, hearing aids, etc.) becoming an impactful part of the acoustic system. This avoids having to use an unrealistic sound pressure level (SPL) since identical pressure measurements might be sampled even though two different headphones are perceived as tonally different from each other by a listener. Thus, in deriving and using sound intensity/power using opposing microphones at or within a threshold distance of the eardrum area (e.g., one centimeter), the HATS measurement system can use a quantity that more accurately scales/matches human perception of volume. Present principles can be applied to a variety of fields of research and/or development which attempt to understand perceived frequency response for audio that a device outputs.

The proposed measurement system therefore uses/derives either sound power level or sound intensity level at the HATS eardrum, which are proportional to each other in this measurement system because the area of the ear drum is constant, to understand the perceived frequency response of the DUT. The result is a measurement quantity that is directly related to perception of volume across the human range of hearing. This matching of perception and measurement quantity is consistent regardless of the acoustic impedance of the DUT and how that impedance affects the overall acoustic impedance of the full measurement system.

It is also noted that present principles may relate to head-related transfer functions (HRTFs). Thus, measuring a HRTF may involve measuring the pressure at the eardrum of a HATS or the pressure with a single microphone inside a real persons ear canal. But the sound that a person experiences while listening back with a personalized HRTF would only match the targeted HRTF sound if the system used to create the signal during HRTF measurement is the same system they are listening with for audio playback afterwards. For example, if a HRTF is measured using a sine sweep through headphones, the listening experience will be different if the user listens back later with a different style of headphones. This is because the system's acoustic impedance is different between the two scenarios, so the equalized headphones could match in terms of pressure but not in terms of intensity. Accordingly, using present principles, deriving the intensity or power would give a HRTF that achieves the target sound of the HRTF regardless what style of headphones get used later, as long as the headphones are set to match the intensity of the original HRTF measurement.

Before concluding, it is to be understood that although a software application for undertaking present principles may be vended with a device, present principles apply in instances where such an application is downloaded from a server to a device over a network such as the Internet. Furthermore, present principles apply in instances where such an application is included on a computer readable storage medium that is vended and/or provided by itself, where the computer readable storage medium is not a transitory signal and/or a signal per se.

It may now be appreciated that present principles provide, among other technical improvements, improved computer-based user interfaces that increase the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein.

What is claimed is:

1. An apparatus, comprising:

a synthetic human ear, the synthetic human ear comprising a first microphone and comprising a second microphone;

circuitry in the synthetic human ear, the circuitry configured for receiving input from the first and second microphones and providing the input to a processor system configured for determining, using the input from the first and second microphones, a sound power level, a sound intensity level, or both a sound power level and sound intensity level for adjusting at least one audio sound source.

2. The apparatus of claim 1, comprising a head and torso simulator (HATS) system, wherein the synthetic human ear forms part of the HATS system.

3. The apparatus of claim 1, wherein the synthetic human ear comprises the first and second microphones and no other microphones.

4. The apparatus of claim 1, wherein the first and second microphones oppose each other in a plane that extends transversely across an ear canal of the synthetic human ear.

5. The apparatus of claim 1, wherein the first and second microphones oppose each other such that the first microphone faces toward an eardrum area of the synthetic human ear and the second microphone faces away from the eardrum area of the synthetic human ear.

6. The apparatus of claim 1, comprising:

the processor system; and storage accessible to the processor system and comprising instructions executable by the processor system to:

receive input from the first and second microphones; and use the input to determine the sound power level, the sound power level being for a sound signal emitted by a sound source, the sound power level being different from a sound pressure level for the sound signal.

7. The apparatus of claim 1, comprising:

the processor system; and storage accessible to the processor system and comprising instructions executable by the processor system to:

receive input from the first and second microphones; and use the input to determine the sound intensity level, the sound intensity level being for a sound signal emitted by a sound source, the sound intensity level being different from a sound pressure level for the sound signal.

8. The apparatus of claim 1, comprising:

the processor system; and storage accessible to the processor system and comprising instructions executable by the processor system to:

receive input from the first and second microphones; and use the input to output an indication of one or more adjustments to make to a sound source embodied in headphones or other transducer, the one or more adjustments comprising one or more of:

a software adjustment, a hardware adjustment.

9. A method, comprising:

providing a synthetic human ear, the synthetic human ear comprising a first microphone and comprising a second microphone;

providing circuitry in the synthetic human ear, the circuitry configured for receiving input from the first and second microphones and providing the input to a processor system, the processor system being configured to:

generate, using at least the input from the circuitry, a value representing a fluid velocity; and use at least the fluid velocity to determine one or more of: sound intensity, sound power.

10. The method of claim 9, comprising:

providing a head and torso simulator (HATS) system, wherein the synthetic human ear forms part of the HATS system.

11. The method of claim 9, comprising:

receiving input from the first and second microphones;

using the input to determine a sound power level for a sound signal emitted by a sound source; and making an adjustment to the sound source based on the sound power level.

12. The method of claim 9, comprising:

receiving input from the first and second microphones;

using the input to determine a sound intensity level for a sound signal emitted by a sound source; and making an adjustment to the sound source based on the sound intensity level.

13. An apparatus, comprising:

a synthetic human ear, the synthetic human ear comprising circuitry to derive one or more of: sound power, sound intensity.

14. The apparatus of claim 13, wherein the circuitry comprises a first microphone and a second microphone, the first and second microphones configured within the synthetic human ear, the circuitry configured for receiving input from the first and second microphones and providing the input to a processor system to derive one or more of: sound power, sound intensity.

15. The apparatus of claim 14, comprising a head and torso simulator (HATS) system, wherein the synthetic human ear forms part of the HATS system.

16. The apparatus of claim 14, comprising:

a processor system; and storage accessible to the processor system and comprising instructions executable by the processor system to:

receive signals from the first and second microphones;

generate, using the signals and a first value representing air density, a second value representing a fluid particle velocity; and use the second value and average air pressure as represented by the signals from the first and second microphones to generate a third value, the third value representing one or more of: sound intensity, sound power.

17. The apparatus of claim 16, wherein the instructions are executable to:

apply the third value to at least one acoustic device to produce sound in accordance with the third value.

18. The apparatus of claim 17, wherein applying the sound intensity to at least one acoustic device comprises one or more of:

optimizing a perceived frequency response of a hearing protection device or hearing aid, calibrating and/or setting up a loudspeaker, mastering music, producing content comprising spatial audio, producing stereo music, monitoring noise and/or noise standard acceptance for safety reasons.

19. The apparatus of claim 17, wherein the instructions are executable to:

generate the second value by using Euler's equation on a measured pressure gradient represented by the signals from the first and second microphones in combination with the first value representing air density to generate a fourth value representing a fluid particle acceleration.

20. The apparatus of claim 19, wherein the instructions are executable to:

integrate the fourth value to generate the second value.

* * * * *